United States Patent Office 3,237,662
Patented Mar. 1, 1966

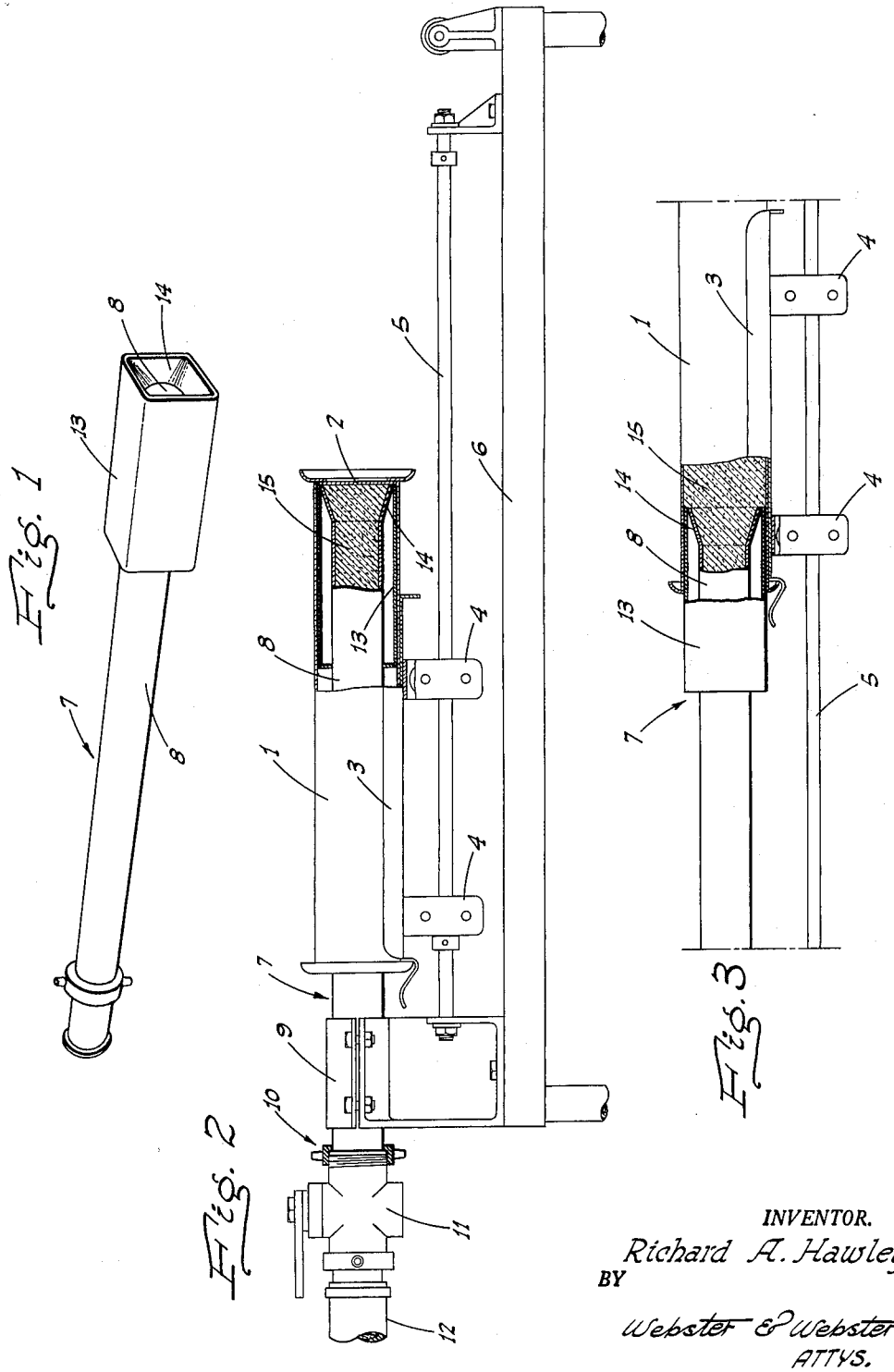

3,237,662
STUFFING HORN FOR FOOD MOLD FILLING MACHINES
Richard A. Hawley, 2440 Scout Road, Oakland, Calif.
Filed Mar. 11, 1963, Ser. No. 264,362
1 Claim. (Cl. 141—263)

The present invention is directed to, and it is a major object to provide, an improved stuffing horn for food mold filling machines; the horn being of the type which is adapted to feed an initially soft food product, such as prepared meat, into a loaf-forming mold engaged in relatively slidable relation on the stuffing horn.

In previous stuffing horns the diameter of the centrally disposed discharge opening of the horn relative to the cross sectional dimension of the mold was such that the meat, as it emerged from the horn and discharged into the mold under pressure, filled the center portion of the mold solidly but frequently left the sides and corner portions of the mold either not completely filled or at best filled with meat of considerably lower density. Under this circumstance, and when the loaf produced in the mold was later sliced, there was a tendency for the meat of lesser density to slough off or become rough near the edges, thus presenting an uneven and quite undesirable appearance.

It is therefore another important object of the present invention to provide a stuffing horn so constructed that the meat discharged therefrom under pressure will not only completely fill the mold throughout its entire cross sectional extent, but will at the same time produce even density of the meat in all portions of the mold. As a consequence, each mold-formed loaf has smooth solid surfaces, and slices from such loaf have a clean-cut and uniform appearance and are more attractive to the ultimate purchaser.

An additional object of the present invention is to provide an improved stuffing horn which, by reason of its ability to completely fill a mold to equal density throughout, is capable of introducing into such mold a greater quanity of meat, by weight, than otherwise possible.

A further object of the invention is to provide a stuffing horn for food mold filling machines which is designed for ease and economy of manufacture.

A still further object of the invention is to provide a practical, reliable, and durable stuffing horn for food mold filling machines, and one which is exceedingly effective for the purpose for which it is designed.

These objects are accomplished by means of such structure and relative arrangement of parts as will fully appear by a perusal of the following specification and claim.

In the drawings:

FIG. 1 is a perspective view of the improved horn, detached.

FIG. 2 is a side elevation, partly broken out and in section, of the horn as mounted in an operative position and as fully inserted into the mold to be filled, and at the outset of the operation.

FIG. 3 is a similar but fragmentary view, showing the mold nearly filled.

Referring now more particularly to the drawings and to the character of reference marked thereon, the mold 1 to be filled is of conventional type and generally square form in cross section. Such mold is initially open at both ends, but is normally closed at one end by a removable closure plate 2; the other end remaining open.

The mold is detachably mounted, in a horizontal position, on a supporting carriage 3 having longitudinally spaced roller-mounting plates 4 depending therefrom; the rollers riding on an elongated rod 5 supported from but above the rigid table 6 of a mold filling machine. The carriage 3 and supported mold 1 have a substantial range of travel on rod 5.

The mold stuffing horn, indicated generally at 7 and which is adapted to enter the mold 1 from its open end, comprises an elongated tube 8 of circular form in section and materially smaller in diameter than the width of such mold. Adjacent its rear end, the tube 8 is removably engaged in a clamping unit 9 supported from the table 6 just beyond the rear end of the rod 5 and so that said tube is parallel to but above the rod, and parallel to and in central alinement with the supported mold 1.

The tube 8, rearwardly of the clamping unit 9, is detachably coupled, as at 10, to a valve 11 which is in communication with a conduit 12 which leads from the apparatus (not shown) which supplies the meat under pressure, and with which the mold is to be filled.

Surrounding the forward end portion of the tube 8 in symmetrical relation thereto and forming a part thereof is a guide head 13 which is of a size and shape to smoothly fit within the mold 1 in guiding relation. At the start of each mold filling operation the carriage 3 is fully advanced with the horn 7 extending into the carriage supported mold 1 and guide head 13 abutting the closure plate 2.

The circular portion of the tube 8 terminates a relatively short distance back from the forward end of the head 13 as clearly shown, and the space otherwise left open between the adjacent ends of the tube and head is closed by an outwardly flaring endless wall 14 extending therebetween and secured thereto.

The wall 14 is therefore partly of frusto-conical form and partly of frusto-pyramidal form, and forms a discharge mouth in the forward end of the guide head 13. Thus, the meat being forced under pressure from the forward end of the relatively small tube 8, which opens centrally through wall 14, is allowed to expand evenly as it moves into the discharge mouth, filling the same. Then, as said meat leaves the mouth and enters the mold 1, it will completely fill—with equal density—the adjacent cross-sectional area of the mold, including the corners thereof.

Therefore, as the carriage supported mold backs away from the horn with the pressure-induced advance of the meat into the mold, the latter becomes completely filled with meat of even density and for the advantageous reasons hereinbefore explained.

The head 13 not only guides the horn in the mold and forms in effect a packing gland, but also protects the forward edge of the discharge mouth from being possibly bent or otherwise damaged when the horn is detached for cleaning or the like.

From the foregoing description, it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful and upon which Letters Patent is desired:

A horn for stuffing an elongated food mold of substantially square cross section, the horn comprising:
  an elongated tube having a forward end portion, the tube being adapted to enter the mold centrally and from one end thereof;
  the tube being of circular cross section and being materially smaller in diameter than the corresponding diameter of the mold;
  a guide head having a forward end on the forward end portion of the tube in substantially symmetrical relation thereto, the head being of substantially square cross section to smoothly fit within the mold in guiding relation; and a flaring discharg mouth comprising a wall of combination frusto-conical and frusto-pyramidal form, extending between the guide head forward end and the forward end portion of the tube so that at its rear end the discharge mouth matches the forward end of the tube, and at its forward end the mouth matches and slideably engages inside the mold.

References Cited by the Examiner

UNITED STATES PATENTS

| | | | |
|---|---|---|---|
| 1,881,106 | 10/1932 | Vogt et al. | 141—263 X |
| 2,635,799 | 4/1953 | Hoy | 141—263 |
| 2,726,024 | 12/1955 | Hawley | 141—263 X |
| 3,010,144 | 11/1961 | Kochjohann | 17—33 X |

LAVERNE D. GEIGER, *Primary Examiner.*

LUCIE H. LAUDENSLAGER, *Examiner.*

E. EARLS, *Assistant Examiner.*